United States Patent
Barthelemy

(10) Patent No.: US 10,623,912 B2
(45) Date of Patent: Apr. 14, 2020

(54) METHOD FOR ENHANCING A VOICEMAIL WITH ADDITIONAL NON-VOICE INFORMATION

(75) Inventor: Serge Barthelemy, Montpellier (FR)

(73) Assignee: PAYCOOL INTERNATIONAL LTD., Causeway Bay, Hong Kong (CN)

( * ) Notice: Subject to any disclaimer, the term of this patent is extended or adjusted under 35 U.S.C. 154(b) by 419 days.

(21) Appl. No.: 13/825,500

(22) PCT Filed: Sep. 26, 2011

(86) PCT No.: PCT/FR2011/000525
§ 371 (c)(1),
(2), (4) Date: Jun. 6, 2013

(87) PCT Pub. No.: WO2012/045922
PCT Pub. Date: Apr. 12, 2012

(65) Prior Publication Data
US 2013/0260729 A1    Oct. 3, 2013

(30) Foreign Application Priority Data
Sep. 28, 2010    (FR) ...................................... 10 03846

(51) Int. Cl.
*H04W 4/12* (2009.01)
*H04M 3/487* (2006.01)
*H04M 3/42* (2006.01)

(52) U.S. Cl.
CPC ......... *H04W 4/12* (2013.01); *H04M 3/42059* (2013.01); *H04M 3/4872* (2013.01)

(58) Field of Classification Search
CPC .......................... H04M 3/42042; H04M 1/575
USPC .............................. 455/415, 413; 379/142.17
See application file for complete search history.

(56) References Cited

U.S. PATENT DOCUMENTS

| | | | |
|---|---|---|---|
| 5,590,184 A | 12/1996 | London | |
| 8,428,551 B1 * | 4/2013 | Peden et al. | 455/405 |
| 2002/0072906 A1 | 6/2002 | Koh | |
| 2005/0129191 A1 * | 6/2005 | Kokko et al. | 379/88.13 |
| 2008/0187125 A1 * | 8/2008 | Siegrist | G06Q 30/016 379/220.01 |

(Continued)

OTHER PUBLICATIONS

International Search Report (PCT/ISA/210) dated Jan. 24, 2012, by the French Patent Office as the International Searching Authority for International Application No. PCT/FR2011/000525.

*Primary Examiner* — Muthuswamy G Manoharan
(74) *Attorney, Agent, or Firm* — Buchanan Ingersoll & Rooney PC

(57) ABSTRACT

The invention relates to a method for creating and transmitting a telephone call requested by a transmitting service to the telephone of a recipient, wherein a server of the transmitting service is capable of submitting a call request to a call server, the call request containing digital information enabling the call server to initiate a call to the telephone of the recipient using a calling number to be displayed on the telephone, wherein the call contains an enhanced voicemail, consisting of a voicemail constructed by the call server from a portion of the information contained in the call request and intended to be broadcast during the call, and additional non-voice information contained in the call request and used by the call server to form the calling number.

12 Claims, 3 Drawing Sheets

(56) References Cited

U.S. PATENT DOCUMENTS

2009/0310766 A1\* 12/2009 Ye .......................... 379/142.17
2010/0198666 A1\* 8/2010 Chiang et al. ............... 705/14.2

\* cited by examiner

METHOD FOR ENHANCING A VOICEMAIL WITH ADDITIONAL NON-VOICE INFORMATION

PRIOR ART

The present invention relates to a method for enhancing a voice message with a complementary non-voice item of information, preferably remanent, and for dispatching a voice message thus enhanced, to the telephone of a recipient.

The development of telephony and especially of mobile telephony has made it possible to offer new messaging services beyond simple voice messaging.

The voice message of a conventional messaging service such as this is a message prerecorded or generated with the aid of a voice synthesis system and broadcast to the recipient during a telephone call. Once the recipient has picked up the call and listened to the message, the latter is in general lost and there no longer remains any trace of the content of the latter.

SMS ("Short Message Service") makes it possible to dispatch a text message of only a limited size, generally up to 160 characters per message. Unlike the simple voice message, the message received by its recipient is recorded on the mobile telephone and can be consulted at any time.

To alleviate the limitations of SMS, MMS ("MultiMedia Messaging Service") was subsequently proposed. The latter makes it possible to place at the disposal of the recipient a more enhanced message than a simple SMS in the form of a multimedia content. In practice, it has been found that the mode of use of MMS and the problems of compatibility of certain telephones mean that MMS has not experienced the expected success.

The email that certain intelligent telephones (so-called "smart phones") are able to manage makes it possible to receive in the form of electronic mail theoretically any type of digital content.

A system which allows the creation and the management of greeting announcements for telephone messaging is moreover known, through a document US 2002/072906 A1, in which a user of a telephone system will be able to employ various tools to create various types of greeting announcement for his messaging and manage the broadcasting thereof as a function of parameters in a calendar. The greeting announcements are intended to be broadcast in response to incoming calls when the recipient is unavailable to take the incoming call. But the announcements thus created are fixed and depend solely on the parameters chosen by the recipient of the incoming calls. This document does not mention the creation on the fly of voice messages created specifically for calls to varied recipients as a function of the context of the call. Neither does it describe the sending of outgoing calls for which the caller number would be substituted by a string of digits containing an item of information complementary to the content of the voice message.

Circumstances exist of course where the sending of a simple voice message is very well suited to the need both of its sender and of its recipient. But in other circumstances, it goes awry through the fact that it is not possible for another succinct item of information, complementary to the content of the voice message, and preferably remanent, to be communicated simultaneously to the recipient.

In circumstances of this kind, the technical problem to be solved then consists in transmitting to the recipient of a voice call by telephone, an additional item of information, not contained in the voice message itself and complementary with respect to it. This item of information will preferably be remanent, so that the recipient can refer thereto and utilize it subsequently. Of course, the solution to this technical problem must not reproduce the drawbacks of cost or unwieldiness that were mentioned with respect to the known techniques cited above.

It may also be necessary that the complementary item of information to be conveyed with the voice message be confidential or that it must be interpretable only by the recipient of the voice message.

To succeed in communicating a complementary item of information associated with a voice message, it is then necessary to communicate said item of information through a channel other than the voice channel, such as SMS, MMS or indeed an email. This turns out to be not only unwieldy, expensive (the cost of the call plus the cost of an SMS), and very impractical or indeed perplexing for the user.

AIM OF THE INVENTION

The general aim of the present invention is consequently to afford a solution to the limitations related to the simple broadcasting of a voice message by telephone and to allow the user to employ, simultaneously with the broadcasting of the voice message, a succinct non-voice complementary item of information, preferably remanent, so that it will remain available and will be able to be used after the message has been listened to by its recipient.

Another aim of the invention is to propose a scheme which ensures the confidentiality of the complementary item of information conveyed with the voice message.

Another aim of the invention is to propose a scheme of interactive use of the complementary item of information conveyed with the voice message.

In order to ensure better clarity of the ensuing description of the invention, it is useful to introduce a certain number of definitions of the main elements which participate in the implementation of the method.

Sender Service: this is an entity such as an enterprise, a department of an enterprise, an association, a public service, etc., that desires to dispatch Enhanced Voice Messages to its customers, clients, users, subscribers or more generally to any person having a telephone, mobile or otherwise, and here called a Recipient. The Sender Service has computerized and communication means suited to the dispatching of requests to send voice messages to a Call Server and to the receiving in return of the confirmations or of any information relating to these messages.

Enhanced Voice Message: this is a voice message requested by the Sender Service, assembled or constructed by a Call Server, dispatched by the latter via a call from the Telephone of a Recipient and simultaneously conveying a voice message and a Complementary Item of Information, preferably remanent, inserted into the Caller Number.

Call Server: this is a computerized server having:
  capabilities for connections with one or more Sender Services,
  data processing and management capabilities,
  connections with one or more voice telephone networks.
Advantageously the Call Server will have several telephone lines provided by the main operators of the country so as to be able to choose the line which is most appropriate for sending a call to a subscriber of a particular operator.
  a program implementing an algorithm capable of carrying out, when invoked by a Sender Service, the construction or the assembling of an Enhanced Voice Message and of triggering a call to the Telephone of a Recipient.

The Call Server within the meaning of the invention can be operated either by the Sender Service or by an entity independent of the Sender Service.

Complementary Item of Information: this is a non-voice item of information consisting of a string of alphanumeric, or even simply numeric, characters inserted into the Caller Number and preferably remanent, so as to remain accessible by the Recipient after the receipt of a voice message, especially by featuring in the list of the received calls of the latter's Telephone.

Caller Number: this is a string of generally numeric characters, which appears on the display of a Telephone to indicate the origin of a call, it is also very often called the "Caller ID" in international documents.

Recipient: any person having a Telephone.

Telephone: mobile or fixed telephone endowed at least with a display able to display the Caller Numbers, or any electronic apparatus capable of receiving telephone calls and of displaying the Caller Numbers.

Network Terminal: personal computer, telephone, or any other type of electronic apparatus having at least a screen and able to connect to a digital network, for example the Internet, to access on-line sites and interact with said sites.

In certain cases it may happen that the Telephone and the Network Terminal are merged into one and the same apparatus.

In the subsequent description of the invention, the terms or expressions defined above will be used with Upper Case letters whenever they are used with the meaning as defined.

SUBJECT OF THE INVENTION

The aims alluded to hereinabove are achieved by the method according to the invention.

In order to solve the problem posed, the invention proposes a method for creating and transmitting a telephone call invoked by a Sender Service to the Telephone of a Recipient, in which a server of the Sender Service is able to present at a Call Server a call request containing numerical information allowing the Call Server to trigger a call to the Telephone of the Recipient from a Caller Number intended to be displayed on said Telephone, characterized in that said call contains an Enhanced Voice Message, constituted on the one hand by a voice message which is constructed by the Call Server on the basis of a part of the information contained in said call request and which is intended to be broadcast during said call, and on the other hand by a non-voice Complementary Item of Information, contained in said call request and used by the Call Server to constitute said Caller Number.

In this manner, it becomes possible to communicate to the Recipient any item of information transmitted simply and economically by way of a voice message, enhanced with a Complementary Item of Information contained in the caller number itself, that the User sees displayed on his telephone and which can be kept in a remanent manner in the list of incoming calls.

According to the invention, said Complementary Item of Information consists of a string of alphanumeric characters or usually simply numeric characters, inserted by the Call Server into said Caller Number intended to be displayed on the Telephone of the Recipient of the call on receipt of the latter, and said voice message indicates to the Recipient the nature and the use of said Complementary Item of Information.

Of course, the nature and the precise use of the Complementary Item of Information will depend on the application context of the method according to the invention, and is not limiting to the present invention.

According to the invention, several modes of transmission are possible for communicating the meaning of the Complementary Item of Information to the Recipient.

According to a first mode of transmission, the meaning of said Complementary Item of Information is communicated to the Recipient solely and entirely by means of said voice message.

According to another mode of transmission, the meaning of said Complementary Item of Information is communicated to the Recipient in part by means of said voice message, and in part by a means independent of the voice message.

Alternatively, it is also possible to contrive matters so that the meaning of said Complementary Item of Information is indicated in full by a means independent of the voice message. For example, it may be advantageous that the meaning of said Complementary Item of Information is entirely indicated in a Web page of a transactional site to which the Recipient is moreover connected by means of a Network Terminal, such as for example display on the on-line site of the Sender Service or the like. In this particular case where the entire meaning of the Complementary Item of Information is indicated entirely by a means other than the voice message it may be advantageous to envisage having an empty voice message, that is to say no voice message.

Preferably, said Complementary Item of Information is remanent in the Telephone of the Recipient so as to be able to be consulted by the latter on demand. It may also have a time-limited validity, in which case it is useful for this duration of validity to be indicated in said voice message.

According to one embodiment of the method according to the invention, to enhance the voice message with a Complementary Item of Information, the method comprises the following steps:

construction by a program at the level of the server of the Sender Service of a call request file indicating a set of parameters for the synthesis of the Enhanced Voice Message;

transmission of said call request file to said Call Server;

on receipt of said file by the Call Server, running by the latter of a processing program able to construct a Caller Number incorporating said Complementary Item of Information and to transmit said voice message to the Telephone of the Recipient while causing the display of said Caller Number on the Telephone of the Recipient.

According to the invention, the request file comprises at least the text of a voice message intended for the Recipient in the form of one or more text files (T1, . . . Tm) or the audio file itself, the Telephone number of the Recipient, and the Complementary Item of Information intended for the Recipient, and the meaning of the Complementary Item of Information in the cases where the latter is designed to be communicated partially or entirely to the Recipient via his Telephone.

But it may be useful that said request file furthermore comprises one or more of the following elements: the name of the Recipient, a type of voice to be used for the generation of the Enhanced Voice Message on the basis of the request file, this type of voice being chosen from among several available types of voice (V1, . . . , Vn), a sequencing instruction defining the order in which the elements of the request file must be assembled, a dispatch instruction defining the dispatch parameters for the Enhanced Voice Message, and a limit-of-validity date and time for the Complementary Item of Information included in the Enhanced Voice Message.

The program for processing the request file operating in the Call Server comprises one or more of the steps consisting in:

- delivering an acknowledgment of receipt of the request file to the Sender Service;
- converting the text files of the request file into voice files, with the aid of a voice synthesis program and by using the type of voice indicated in the request file;
- assembling in the order specified in the request file the various voice elements which will constitute the voice part of the message. It should be noted that in the case where the meaning of the Complementary Item of Information is indicated entirely by a means other than the voice message, the text or audio files may be empty or even absent from the request file and thus the voice message is then empty.
- assembling the country code and the Complementary Item of Information in the position specified in the request file, with a possible prefix so as to construct the Caller Number associated with the specified Enhanced Voice Message;
- verifying the availability of the Caller Number, namely the fact that the Caller Number thus constituted is not an already allocated telephone number or is not allocated to a third party other than the Sender Service;
- triggering on the basis of the Call Server a call to the telephone number of the Recipient from a call line, and substituting the Caller Number for the number of this line, so as to cause the display of the Caller Number on the Telephone of the Recipient;
- dispatching by the Call Server a confirmation to the system of the Sender Service, indicating that the call to the Recipient corresponding to the request has indeed been made and that pickup has indeed been obtained, with the date and time it was made.

The subject of the invention is also a system for the creation and the transmission of a voice message on the basis of the server of a Sender Service to the Telephone of a Recipient via a Call Server, characterized in that the server comprises a program able to prepare a call request containing a digitized voice message and to transmit it to the Call Server, and in that the Call Server comprises a program able to receive said call request and to construct an Enhanced Voice Message comprising on the one hand a voice synthesis of said digitized voice message, and on the other hand a non-voice Complementary Item of Information able to be used by the Call Server to constitute a Caller Number intended to be displayed on the Telephone of the Recipient.

Advantageously, in this system, the meaning of said Complementary Item of Information is contained at least partially in said voice message, but it is also possible for it to be fully contained in said voice message, or conversely signified in full to the Recipient by another means.

The subject of the invention is finally the use of the method described for the validation of an on-line transaction, this use being characterized by the fact that said Complementary Item of Information contains at least one item of information representative of said on-line transaction (amount, recipient), and a validation code for said on-line transaction.

DETAILED DESCRIPTION OF THE INVENTION

The invention will be better understood by referring to the description which follows as well as to the appended figures, in which.

Figure 1:
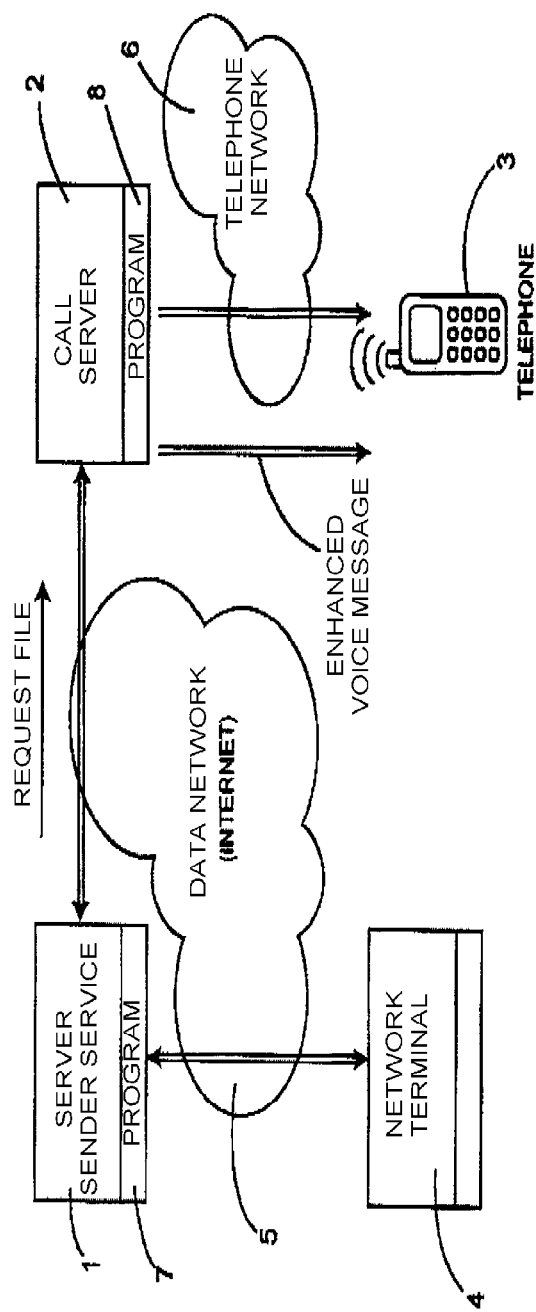
FIG. 1 represents a basic diagram of a system able to implement the method according to the invention.

The following examples will make it possible to better illustrate the method according to the invention. These examples are wholly non-limiting and all use the same underlying principle, namely the incorporation into the voice message of instructions for interpreting or using a remanent non-voice Complementary Item of Information contained in the number of an incoming call.

Example 1: Use of the Method According to the Invention for Access to a Physical Site, for Example a Hotel Room with a Room Number and an Access Code Nowadays self-service hotels exist, that is to say ones with no reception. Generally the customers book their room by Internet on the hotel's site and settle the cost of their room on-line with the aid of their debit or credit card. The card which was used for settlement then serves as hotel access card. The customer on his arrival at the hotel inserts his card into a reader and is allocated a room number and an access code. But, on-line payment with a virtual card (single-use) renders this procedure impossible. The method according to the invention affords a simple and inexpensive solution to this problem, as is apparent hereinbelow.

Step 0: The Internet site of the hotel (the Sender Service) has just recorded a purchase of an overnight stay by a customer (the Recipient), it detects that payment has been made with a virtual card. The Sender Service then asks the customer to enter his mobile telephone number on his Network Terminal in order to be able to forward him the details about how to access the hotel. The system of the Sender Service determines the number of the room allocated to this customer as well as an access code. It will consequently be necessary to communicate this number and this access code to the customer via his telephone.

Step 1: The system of the Sender Service constructs a request file containing in digital form the following elements:

- a musical greeting announcement also called a "jingle", delivered in the form of an audio file;
- the name of the Recipient (M. Dupond);
- a text to be spoken in the audio message (for example of the type: "Hello Monsieur Dupond, thank you for your order for one night at our hotel, your room number consists of the last 3 digits of the caller number and your access code consists of the 4 digits preceding your room number; we wish you a pleasant stay");
- optionally the type of voice to be used (for example a female voice) during playback of the audio message;
- the telephone number of the Recipient;
- a limit date and time of dispatch of the Enhanced Voice Message
- the Complementary Item of Information which will have to be communicated at the same time as the audio message and consisting, in the example chosen, of a 4-digit access code (for example 9876), and of a 3-digit room number (for example 231) which will have to be presented sequentially.

Step 2: The system of the Sender Service dispatches this request file to the Call Server with a request to dispatch, before the limit date and time indicated, an Enhanced Audio Message to the Recipient by using the elements contained in the file appended to the request.

Step 3: On receipt of this request the Call Server will execute the following operations:
1—It acknowledges receipt of the request file to the Sender Service
2—It constructs the audio message intended for the User, by creating the voice version of the text contained in the request file with the aid of a voice synthesis program while using the type of voice requested, namely a female voice in the example chosen.
3—It lifts the Complementary Item of Information (for example 9876231) from the request file and constructs a Caller Number containing this Complementary Item of Information. This Caller Number is then of the type (in France): +3399 9876 231. It is seen that the digits in bold corresponding to the Complementary Item of Information are concatenated with other digits chosen by the Call Server to constitute the Caller Number.
4—It verifies that the Caller Number thus constituted is not a telephone number already allocated to a third party. For this at least two modes of verification are possible, separately or together: either the consultation of the numbering plan published by the country's telecommunications regulating authority, or the triggering of a call to the Caller Number. In the case where the latter is already allocated to a third party, the verification call will cause a ring tone to sound, and in the converse case a signal will indicate that the number is not allocated. If the number is already allocated, the Call Server repeats this operation and modifies the Caller Number, without modifying the Complementary Item of Information, until confirmation is obtained that the Caller Number is not allocated to a third party.
5—Once this verification of the Caller Number is finished, the Call Server triggers a call to the telephone number of the Recipient (this number is contained in the request file), replacing the number of the calling line by the Caller Number so as to cause the display of the Caller Number such as finalized in step 4, on the screen of the Telephone of the Recipient.
6—The Recipient will then receive on his telephone a call originating from the Caller Number (here +3399 9876 231), and by picking up he will be able to hear an Enhanced Voice Message, the voice part of which will indicate to him the nature and the use of the Complementary Item of Information inserted into the Caller Number. For example, the following audio message: "jingle—Hello Monsieur Dupond, thank you for your order for one night at our hotel, your room number consists of the last 3 digits of the caller number and your access code consists of the 4 digits preceding your room number; we wish you a pleasant stay". It is clearly seen that in this way the Recipient is forwarded a Complementary Item of Information, relating to the access codes for his room, which Item of Information is inserted into the Caller Number, and the meaning and the use of this Complementary Item of Information are disclosed to him by way of the voice message.

Step 7: After the call is made, the Call Server dispatches to the Sender Service a confirmation that the call corresponding to the request has indeed been made to the Recipient, as well as the date and time it was made.

After this incoming call, the Recipient has in his list of calls received, the Caller Number for which he knows that the latter contains the elements (the Complementary Item of Information) which will enable him to access his room at the appropriate time. Moreover he alone knows that the Caller Number contains information essential to him, thereby considerably increasing security.

It is noted here obviously that the Complementary Item of Information contained in the Caller Number is confidential. Indeed in no case could any person foreign to the Recipient succeeding in consulting his list of incoming calls guess that one of these numbers contains the number of the room and the access code for the hotel where the overnight stay has been purchased.

According to a variant embodiment, the Sender Service can specify in its request file that the caller number always begins with the same characters for example here with +33099, so that the Recipients easily recognize the Caller Number and/or the sender of the call; thus in the example hereinabove the Caller Number would become +33099 9876 231.

The Recipient himself will not have to memorize either the room number or the access code, he will merely be required at the appropriate time to take his telephone to consult his list of calls received, select the Caller Number, and deduce therefrom the elements which will enable him to access his room and use them.

In this first exemplary use of the method according to the invention, it is noted that once the Enhanced Voice Message has been received, the Recipient no longer has any interaction with the Sender Service. Another exemplary use will illustrate a case of use where the Recipient will use the Complementary Item of Information to interact with the Sender Service and its system.

Example 2: Use of the Method According to the Invention for the Secure Carrying Out of an On-Line Commercial Transaction The large expansion in on-line commerce has aroused an equally significant expansion in fraud and attempted fraud by malicious individuals who use a great variety of techniques to achieve their purpose: spy programs, keyloggers, Trojan horses, phishing, so-called man-in-the-middle attacks. Among the most recent attacks, we note that referred to as man-in-the-browser, where malware has succeeded in transplanting itself into a user's Internet browser and in modifying for its profit financial transactions that the user carries out.

As will be described in greater detail hereinbelow, it is perfectly possible to use the method according to the invention to allow a user to verify and validate the on-line commercial transaction that he is in the process of carrying out in order to counter the frauds mentioned.

It is assumed that a user makes an on-line purchase on a trade site, for example the site with address Url: www.merchant.fr. At the time of paying the amount of his purchase for a value of €79.88, he chooses to debit his bank account since the site Merchant.fr has concluded an agreement with his bank allowing this operation. At this time a window of the bank site opens and indicates to the user that he will receive a call on his Telephone, and the bank site asks him to follow the instructions given by this call.

The steps of the method according to the invention within the framework of this exemplary transaction are listed hereinafter:

Step 0: the site of the bank (Sender Service) of the user (the Recipient) receives a request for payment from the trade site "merchant.fr", the payment having to be performed by debiting the bank account of the Recipient for an amount of €79.88.

Step 1: the system of the Sender Service (the bank) constructs a request file containing the following elements:
the name of the Recipient (M. Dupond), a text to be spoken in the voice message envisaged for the user (for example: "Hello Monsieur Dupond, the site merchant.fr is asking us to pay it by debiting your account for an amount indicated in Euro Centimes by the last 6 digits of the Caller Number. If this does indeed correspond to the transaction that you wish to carry out, use the 4 digits preceding the amount of the transaction as validation code and enter them in the location provided in our window; otherwise enter zero 4 times."),
the type of voice to be used (for example a male voice)
the telephone number of the Recipient,
an instruction for immediate dispatch,
the Complementary Item of Information which will have to be communicated at the same time as the voice message and consisting of: a 4-digit validation code (for example 2453), and the amount of the transaction with 6 digits (007988), which will have to be presented sequentially.

Step 2: The system of the Sender Service dispatches this request file to the Call Server with a request for immediate dispatch of an Enhanced Voice Message to the Recipient by using the elements contained in the request file.

Step 3: On receipt of this request the Call Server will execute the following operations:

1—It acknowledges receipt of the request to the Sender Service,

2—It constructs the voice message by creating the voice version of the text contained in the request file with the aid of a voice synthesis program while using the type of voice requested namely a male voice in the example chosen.

3—It assembles the Complementary Item of Information (2453007988) and constructs a Caller Number containing this Complementary Item of Information, namely a number of the type: +3300 2453 007988 in the example chosen.

4—It verifies that the Caller Number thus constituted is not a telephone number already allocated to a third party in the same manner as was described in the previous example 1.

5—Once this verification is finished, the Call Server triggers a call to the telephone number of the Recipient (contained in the request file) and substitutes the Caller Number as finalized at 4 for the calling line number so that the former is displayed on the Telephone of the Recipient.

6—The Recipient then receives a call originating from the Caller Number (here +33002453007988), and by picking up he will be able to hear the following voice message spoken by the Call Server: "Hello Monsieur Dupond, the site merchant.fr is asking us to pay it by debiting your account for an amount indicated in Euro Centimes by the last 6 digits of the Caller Number. If this does indeed correspond to the transaction that you wish to carry out, use the 4 digits preceding the amount of the transaction as validation code and enter them in the location provided in our window; otherwise enter zero 4 times.".

Step 4: After making the call, the Call. Server dispatches to the system of the Sender Service a confirmation that the call corresponding to the request has indeed been made to the recipient, with the indication of the date and time it was made.

Step 5: the Recipient, after having listened to the message received, notes that the transaction mentioned in the message is indeed that which he wishes to carry out, examines the Caller Number and enters the code contained in the latter, namely 2453, in the window of the bank site, by means of his Network Terminal. In this case the validation of the transaction is done, the on-line purchase process can be terminated.

Ultimately, through this example it is clearly seen that it is possible to use the method according to the invention for the validation of an on-line transaction. It is simply necessary that the Complementary Item of Information contain at least one item of information representative of said on-line transaction (for example its amount, or its recipient), and a validation code for the transaction.

In the case where the recipient might have been confronted with an attack of man-in-the-browser type, it is likely that the bank would have received a transaction request, modified by the malicious program without the knowledge of the Recipient, in favor of a beneficiary other than the site merchant.fr, and with an amount that is likewise probably different. In this case the message received would not have indicated either merchant.fr nor the right amount of the transaction. This item of information for validating the transaction being conveyed by a totally different channel from the Internet channel, namely by way of an Enhanced Voice Message transmitted by a Call Server, this validation item of information is neither accessible nor interceptable by the Internet browser and therefore by the malicious program. In no case can it therefore be modified by the malicious program transplanted into the browser and without the knowledge of the parties involved. The Recipient can then simply decline the fraudulent transaction by entering the code 0000.

Generic Description of the Method According to the Invention

Beyond the two specific application examples described hereinabove, it is appreciated that the method according to the invention can be generalized as follows.

The method according to the invention involves the following physical entities or parties, such as represented in FIG. 1:
a Sender Service, which has computerized means for example in the form of a server 1 and digital connections to digital networks (Internet, or other), optionally an on-line service accessible from the Internet.
A Call Server 2 which can be hosted and operated by a third party or directly by the Sender Service.
A Recipient who has a Telephone 3 and who can in certain cases use a Network Terminal 4 to connect to the on-line service of the Sender Service.

The server 1 of the Sender Service, the Call Server 2 and the Network Terminal can communicate by way of a data network 5, for example the Internet network, whereas the Call Server 2 is capable of calling the Telephone 3 of the Recipient by means of the telephone network 6.

Figure 2:
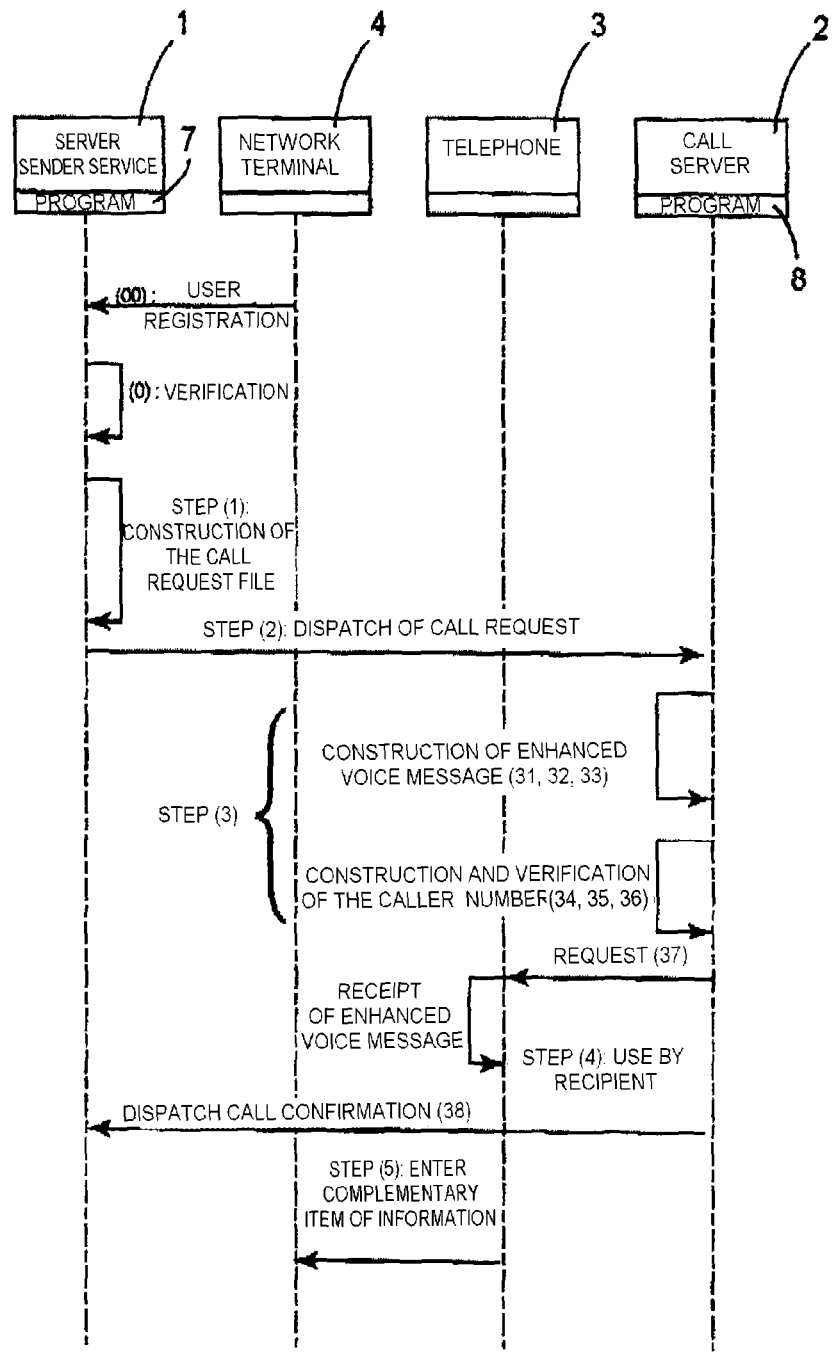
FIG. 2 represents an overall flowchart of the method according to the invention, revealing the set of elements of the system implementing the various steps, including the Telephone of the Recipient, and for certain applications requiring access to an on-line network, the Network Terminal of the Recipient.
Figure 3:
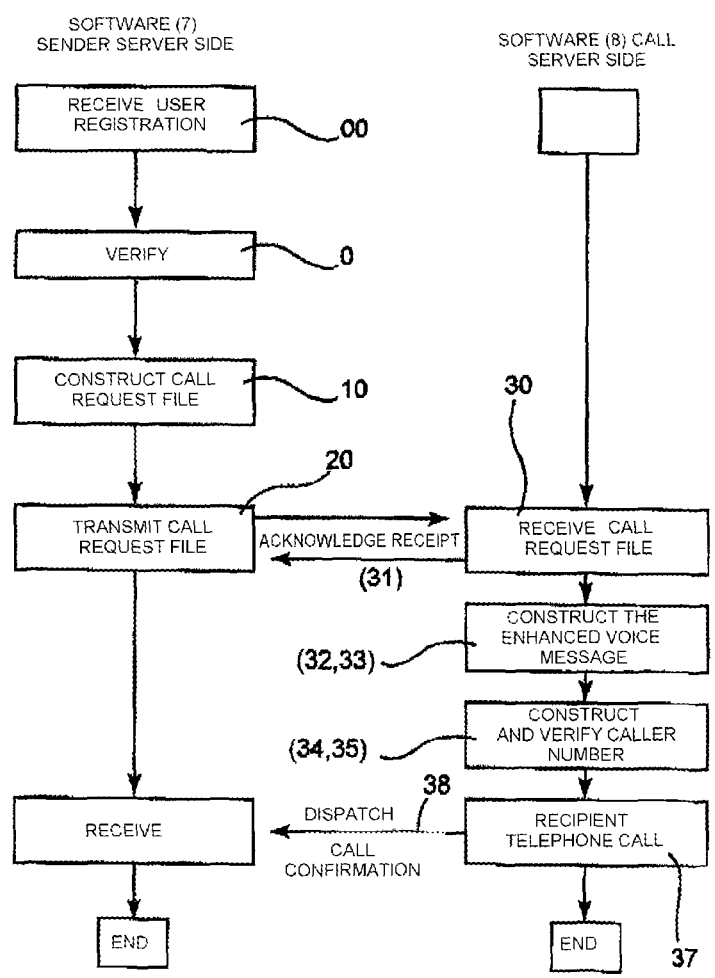
FIG. 3 represents a flowchart of the steps of the method according to the invention, such as they are implemented by the respective programs of the server of the Sender Service and of the Call Server.

The method according to the invention comprises various steps described in conjunction with FIG. 2. These various steps will allow the Sender Service to dispatch an Enhanced Voice Message to the Recipient via the Call Server 2. The Recipient is a person known to the Sender Service or who has just made himself known to it in a conventional registration process (step (00) of FIG. 2) preceding the dispatching of an Enhanced Voice Message and in the course of which he will in particular have forwarded his Telephone number to the Sender Service.

Step 0: the system of the Sender Service verifies that it has the elements necessary to constitute and request the dispatching to the Recipient, of an Enhanced Voice Message (telephone number of the Recipient, elements of content of the message, etc.).

Step 1: the system of the Sender Service constructs (namely the server 1 of the Sender Service on which a specific program 7 runs), a request file containing a set of digitized elements such as:

- One or more audio files (A1, . . . An) that may consist of sounds, music or the like;
- One or more text files (T1, . . . , Tm). These files contain information, generally customized, related to the Recipient, (name, event justifying the dispatching of the Enhanced Voice Message, meaning of the Complementary Item of Information, instructions, etc.). These text files are intended to be converted by the Call Server into voice message with the aid of a voice synthesis program, and then to be integrated into the Enhanced Voice Message. It is by listening to the voice version synthesized on the basis of these files that the Recipient will be able to discover the composition and the meaning of the Complementary Item of Information contained in the Caller Number and that he will know how to use it. In another embodiment, the content of the voice message can be communicated directly in the form of an audio file instead of a text file, and this may be relevant especially when the content of the voice message is often or always the same, thereby avoiding having to perform a voice synthesis with each send;
- A type of voice (V1, V2, . . . Vn) to be used by the voice synthesis program to convert the text files into voice message;
- A sequencing instruction which defines the order in which the audio elements of the voice message must be assembled (for example: A1, T1, T2, T3, A2). It should be noted that in the particular case where the meaning of the Complementary Item of Information is indicated entirely by a means other than the voice message, then the audio and text messages (Ai, Ti) may be empty or not figure at all in the request file dispatched by the Sender Service to the Call Server. In this case the voice message is then empty.
- The telephone number of the Recipient;
- A dispatch instruction comprising dispatch parameters for the Enhanced Voice Message: date and time of dispatch (or Immediate dispatch), the number of rings, the number of tries in the case where the Telephone of the Recipient is not picked up, the interval between each try;
- the Complementary Item of Information consisting of an alphanumeric or numeric, but usually numeric, character string of limited length (for example: 078915566) while specifying the position that it will have to occupy in the Caller Number (for example: end of the number). The maximum length of this string of characters is a data item provided beforehand by the Call Server to the Sender Service, it will depend especially on the telephone networks used by the latter.
- Optionally a prefix, consisting of a few characters (for example: 999), intended to appear at the head of the Caller Number in order to allow the Recipient to readily recognize that the call conveying the Enhanced Voice Message originates from the Sender Service;

Step 2: The system of the Sender Service dispatches this request file to the Call Server so that the latter undertakes the construction of the Enhanced Voice Message corresponding to the request file, and its dispatch to the Recipient.

Step 3: On receipt (30) of this request file the Call Server 2 runs its requests processing program 8 which will construct at 31 an Enhanced Voice Message, on the basis of the information received in the request file. Accordingly, the Call Server provided with its specific program 8 will execute the following operations:

31. It acknowledges receipt of the request file to the Sender Service;

32. It converts the text files of the request file into audio files, with the aid of a voice synthesis program and using the type of voice indicated in the request file in so far as these files are not empty.

33. Next it assembles in the order specified in the request file the various audio elements (namely the voice synthesis of the text files, and the non-voice audio files) which will constitute the audio part of the message (for example; A1, T1, T2, T3, A2). In the particular case where the files Ai and Ti are empty or nonexistent in the request, then the voice message is empty.

34. It assembles the country code (for example 33), the Complementary Item of Information in the position specified in the request file, and a possible prefix to construct the Caller Number (for example: 33999078915566) corresponding to the Enhanced Voice Message specified;

35. It verifies the availability of the Caller Number, namely the fact that the Caller Number thus constituted is not an already allocated telephone number or is not allocated to a third party other than the Sender Service. Accordingly at least two modes of verification are possible: either the consultation of the numbering plan published by the country's telecommunications regulating authority, or the triggering of a call to the Caller Number constituted hereinabove. In the case where the latter is allocated, the call will cause a ring tone to sound, in the converse case a signal will indicate that the number is not allocated. If the number is already allocated, the Call Server modifies the Caller Number, by adding or deleting characters, without altering the Complementary Item of Information and its position, and repeats this verification operation, until confirmation is obtained that the Caller Number is not allocated to a third party.

36. Once this verification is finished, the Call Server determines, by analyzing the telephone number of the Recipient (contained in the request file), to which operator the latter has subscribed and preselects a line (from among the telephone lines available to it for sending its calls) which is of the same operator and on the basis of which it will be able to send its call. This choice is not indispensable but advantageous for reducing the cost of the call which will be sent to the Recipient;

37. The Call Server triggers a call to the telephone number of the Recipient from the line preselected in the previous phase and substitutes the number of this line with the Caller Number constituted in phase 34, the effect of which will be to cause the display of the Caller Number (for example here: +33999078915566) on the Telephone of the Recipient.

The Recipient then receives a call originating from the Caller Number (here, +33999078915566). In the case where the Recipient does not pick up the call, the Call Server repeats the call the number of times indicated and at the intervals indicated in the request file dispatched by the Sender Service.

38. After the call is made, the Call Server 2 dispatches to the system of the Sender Service 1 a confirmation that the call to the Recipient corresponding to the request has indeed been made and that pickup has indeed been obtained, with the date and time it was made. In the case where no pickup has been obtained after the number of specified tries, the Call Server dispatches the record of the calls sent and not picked up with the date and time at which they were made.

Step 4: By picking up the call, or by consulting his voice messaging if the call has been directed to the latter, the Recipient takes cognizance of the voice message consisting of the elements created and assembled in phases 32 and 33 of step 3 (for example here the audio version of: A1, T1, T2, T3, A2). It is by listening to the voice message that he discovers that the Caller Number contains an item of information relevant to him: the Complementary Item of Information, and that the voice message indicates the meaning of this Complementary Item of Information to him and optionally how and where to use all or part of this item of information. After listening to the voice Message the Recipient keeps the Caller Number in his list of calls received on his Telephone, for possible subsequent use.

The process can be interrupted at this call receipt step if the Recipient does not need to use all or part of the Complementary Item of Information, this being the case when the Enhanced Voice Message is used simply to communicate an item of information. The process can also continue in an interactive manner with the Recipient, in the case where the latter has to use all or part of the Complementary Item of Information to terminate a process or a transaction that he would moreover have commenced.

Step 5: In the latter case, at the appropriate time the Recipient consults his list of calls, examines the Caller Number, extracts the element or elements contained in the Complementary Item of Information as was indicated to him in the voice message and uses these elements as indicated in the voice message (for example this may be the extraction of a code and its use for the opening of a door (as described in Example 1), or the entering on his Network Terminal of a code extracted from the Complementary Item of Information, for transmission to the server 1 of the Sender Service (as described in Example 2).

In a variant implementation of the method according to the invention, it may be advantageous to disclose the construction, the meaning and the use of the Complementary Item of Information not solely through the voice message communicated by the Call Server, but partially by the voice message and partially by another means. This may for example be useful when the Complementary Item of Information contains both a fairly insensitive data item and a confidential data item. By way of example, it is possible to point out a case where the Complementary Item of Information would equal 078915566 where 07891 would represent a non-sensitive item of information, namely the amount of a transaction of €78.91, and where 5566 would represent a sensitive item of information, namely the code to validate this transaction. In this case it may be advantageous to indicate on the one hand on the site of the on-line service where the transaction will be validated, that the amount to be validated is contained in the 5 digits of the Caller Number preceding the last 4 digits, and to indicate on the other hand solely in the voice message that the validation code for the transaction consists of the last 4 digits of the Caller Number.

In another variant embodiment of the method according to the invention, and with the same logic, it may be advantageous in certain cases to communicate the construction, the meaning and the use of the Complementary Item of Information simultaneously in the voice message and by another means, such as display on the on-line site of the Sender Service or the like.

In an additional variant embodiment of the method according to the invention, it may be advantageous in certain cases to communicate the construction, the meaning and the use of the Complementary Item of Information entirely by a means other than the voice message, such as display on the on-line site of the Sender Service or the like.

In this particular case it may be advantageous that the voice message be empty.

Advantages of the Invention

The method according to the invention makes it possible to address the designated aims, and comprises several decisive advantages with respect to the Prior Art.

The use of the method according to the invention makes it possible in particular for the Recipient to then have a potentially confidential and remanent item of information, which reaches him through the combination of a voice message transmitted by the Call Server, and of a Complementary Item of Information integrated into the Caller Number, the voice message indicating how to interpret and use said Complementary Item of Information.

The use of the method according to the invention makes it possible in particular to dispatch to the Recipient with the aid of a single voice message a Complementary Item of Information which:
- is remanent, in the sense that it persists after listening to the voice message since it is contained in the Caller Number which remains displayed in the list of the calls received on the Telephone of the Recipient;
- is confidential for the Recipient, since it has a meaning and a utility which is disclosed just to the Recipient entirely, partially or not in the voice message and a third party cannot therefore guess the meaning thereof;
- does not cause any cost overhead in respect of its communication since it is conveyed at the same time as the voice message.

This results in numerous other advantages with respect to the prior art, with especially the fact that the transmission of the Complementary Item of Information is done by a different channel which is fully independent of an Internet connection on which the Recipient performs an arbitrary transaction, for example an electronic commerce transaction.

The invention claimed is:

1. A method for creating and transmitting a telephone call invoked by a Sender Service to a Telephone of a Recipient, in which:
   - a server of the Sender Service presents at a Call Server, a call request file containing numerical information enabling the Call Server to trigger a call to the Telephone of the Recipient from a Caller Number intended to be displayed on said Telephone,
   - wherein the call contains an Enhanced Voice Message, constituted by
     - (i) a non-voice Complementary Item of Information, contained in said call request file, that comprises a string of alphanumeric or numeric characters for performing a procedure, and inserted by the Call Server into said Caller Number, and
     - (ii) a voice message which is constructed by the Call Server on the basis of a part of the information contained in said call request file and which includes instructions for using said Complementary Item of Information to perform said procedure;

wherein the call request file comprises at least the Telephone number of the Recipient and the Complementary Item of Information intended for the Recipient;

wherein, on receipt of said call request file by the Call Server, the Call Server executes a processing program to construct a Caller Number incorporating said Complementary Item of Information, and to transmit said voice message to the Telephone of the Recipient while causing the display of said Caller Number on the Telephone of the Recipient;

wherein the call request file further contains one or more of the following elements: the text of a voice message intended for the Recipient in the form of one or more text files or the audio file of such a message, a type of voice to be used for the generation of the Enhanced Voice Message on the basis of the call request file, a sequencing instruction defining the order in which the elements of the call request file must be assembled;

and wherein the processing program comprises one or more of the following steps:

delivering an acknowledgment of receipt of the call request file to the Sender Service;

converting the text files of the call request file into voice files, with the aid of a voice synthesis program and by using the type of voice indicated in the call request file;

assembling in the order specified in the call request file the various audio elements which will constitute the audio part of the message;

assembling the country code and the Complementary Item of Information in the position specified in the call request file, with a possible prefix so as to construct the Caller Number associated with the specified Enhanced Voice Message;

verifying the availability of the Caller Number, including whether the Caller Number is not an already-allocated telephone number or is not allocated to a third party other than the Sender Service;

triggering on the basis of the Call Server a call to the telephone number of the Recipient from a call line, and substituting the Caller Number for the number of the call line, so as to cause the display of the Caller Number on the Telephone of the Recipient;

dispatching by the Call Server a confirmation to the system of the Sender Service, indicating that the call to the Recipient corresponding to the request has been made and that pickup has been obtained, with the date and time it was made.

2. The method as claimed in claim 1, wherein the instructions for using said Complementary Item of Information are communicated to the Recipient solely by means of said voice message.

3. The method as claimed in claim 1, wherein the instructions for using said Complementary Item of Information are communicated to the Recipient in part by means of said voice message, and in part by a means independent of the voice message.

4. The method as claimed in claim 3, wherein the means independent of the voice message comprise a means for displaying a Web page of a transactional site to which the Recipient is connected by means of a Network Terminal.

5. The method as claimed in claim 1, wherein the Complementary Item of Information is stored in the Telephone of the Recipient so as to be able to be consulted by the Recipient on demand.

6. The method as claimed in claim 1, wherein the Complementary Item of Information has a time-limited validity.

7. The method as claimed in claim 1, wherein to transmit a Complementary Item of Information with the voice message, the method comprises the following steps:

construction, by a program at the level of the server of the Sender Service, of a call request file indicating a set of parameters for the construction of the Enhanced Voice Message;

transmission of said call request file to said Call Server.

8. The method as claimed in claim 1, wherein the request file furthermore comprises one or more of the following elements: the instructions for using the Complementary Item of Information, the name of the Recipient, said type of voice being chosen from among a plurality of available types of voice, a dispatch instruction defining the dispatch parameters for the Enhanced Voice Message, and a limit-of-validity date and time for the Complementary Item of Information included in the Enhanced Voice Message.

9. The method as claimed in claim 1, wherein the procedure comprises an on-line transaction, and wherein the Complementary Item of Information contains at least one item of information representative of said on-line transaction, and/or a validation code for said on-line transaction.

10. The method as claimed in claim 1, wherein the procedure comprises access to a secure location, and wherein the Complementary Item of Information contains at least one item of information representative of said location, and/or a validation code for said access.

11. A system for the creation and the transmission of a voice message comprising:

a server of a Sender Service that transmits the voice message to a Telephone of a Recipient via a Call Server, wherein the server comprises a program configured to prepare a call request file containing a digitized voice message and to transmit the message to the Call Server, and wherein the Call Server comprises a program configured to receive said call request file and to construct on the basis of this call request file an Enhanced Voice Message comprising:

(i) a non-voice Complementary Item of Information contained in said call request file that comprises a string of alphanumeric or numeric characters for performing a procedure, and able to be inserted by the Call Server into a Caller Number intended to be displayed on the Telephone of the Recipient, and (ii) a voice synthesis of said digitized voice message, wherein said voice message includes instructions for using said Complementary Item of Information to perform said procedure;

wherein the call request file comprises at least the Telephone number of the Recipient and the Complementary Item of Information intended for the Recipient;

wherein the Call Server is configured, on receipt of said call request file, to execute a processing program to construct a Caller Number incorporating said Complementary Item of Information, and to transmit said voice message to the Telephone of the Recipient while causing the display of said Caller Number on the Telephone of the Recipient;

wherein the call request file further contains one or more of the following elements: the text of a voice message intended for the Recipient in the form of one or more text files or the audio file of such a message, a type of voice to be used for the generation of the Enhanced Voice Message on the basis of the call request file, a sequencing instruction defining the order in which the elements of the call request file must be assembled;

and wherein the processing program comprises one or more of the following steps:

delivering an acknowledgment of receipt of the call request file to the Sender Service;

converting the text files of the call request file into voice files, with the aid of a voice synthesis program and by using the type of voice indicated in the call request file;

assembling in the order specified in the call request file the various audio elements which will constitute the audio part of the message;

assembling the country code and the Complementary Item of Information in the position specified in the call request file, with a possible prefix so as to construct the Caller Number associated with the specified Enhanced Voice Message;

verifying the availability of the Caller Number, including whether the Caller Number is not an already-allocated telephone number or is not allocated to a third party other than the Sender Service;

triggering on the basis of the Call Server a call to the telephone number of the Recipient from a call line, and substituting the Caller Number for the number of the call line, so as to cause the display of the Caller Number on the Telephone of the Recipient;

dispatching by the Call Server a confirmation to the system of the Sender Service, indicating that the call to the Recipient corresponding to the request has been made and that pickup has been obtained, with the date and time it was made.

12. The system as claimed in claim 11, wherein the meaning of said Complementary Item of Information is contained partially in said voice message and partially in another means for conveying information to the Recipient.

\* \* \* \* \*